(12) United States Patent
Nishiguchi et al.

(10) Patent No.: US 8,860,874 B2
(45) Date of Patent: Oct. 14, 2014

(54) IMAGING SENSING DEVICE, IMAGE SENSING PROCESSING DEVICE, AND IMAGE PROCESSING METHOD

(75) Inventors: Tomoaki Nishiguchi, Mito (JP); Hideharu Ono, Mito (JP); Akira Ando, Chigasaki (JP); Makoto Asuka, Mito (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 13/336,443

(22) Filed: Dec. 23, 2011

(65) Prior Publication Data

US 2012/0162496 A1 Jun. 28, 2012

(30) Foreign Application Priority Data

Dec. 27, 2010 (JP) ................. 2010-289067

(51) Int. Cl.
*G02B 27/10* (2006.01)
*G03B 13/00* (2006.01)
*H04N 5/225* (2006.01)
*H04N 5/228* (2006.01)
*H04N 5/232* (2006.01)
*G02B 7/36* (2006.01)

(52) U.S. Cl.
CPC ............. *G02B 7/36* (2013.01); *H04N 5/23212* (2013.01)
USPC ....................... 348/353; 348/208.99; 348/345

(58) Field of Classification Search
USPC ............ 348/208.99, 208.3, 208.12, 345, 349, 348/352, 353
See application file for complete search history.

(56) References Cited

U.S. PATENT DOCUMENTS

2009/0148146 A1* 6/2009 Maeda ........................ 396/89

FOREIGN PATENT DOCUMENTS

JP           11-136562 A      5/1999

* cited by examiner

*Primary Examiner* — Justin P Misleh
(74) *Attorney, Agent, or Firm* — Mattingly & Malur, PC (57) ABSTRACT

For improving picture quality in auto-focus control, image processing device 10 adjusts output picture imaged by image pick-up element 4 and displayed by a display section, comprises storage section 13 for storing predetermined de-focus threshold value of variation amount of intensity value of output picture; first adder section 12 for calculating intensity value time difference variation amount between intensity value of output picture being input and intensity value of the predetermined-time previous output picture before the output picture is input; and variation amount comparison section 14 for comparing intensity value time difference variation amount and de-focus threshold value, wherein when variation amount comparison section determines that intensity value time difference variation amount is less than de-focus threshold value to be a comparison object, intensity value of output picture after being adjusted is calculated by subtracting intensity value time difference variation amount from intensity value of output picture being input.

7 Claims, 5 Drawing Sheets

130 DE-FOCUS THRESHOLD VALUE TABLE
(DE-FOCUS THRESHOLD VALUE
INFORMATION)

| FOCUS-LENS TRAVEL DISTANCE (STEP) [131] | DE-FOCUS THRESHOLD VALUE [132] |
|---|---|
| 0 | 0 |
| 1 | 18 |
| 2 | 20 |
| 3 | 24 |
| 4 | 29 |
| 5 | 33 |

IMAGING SENSING DEVICE, IMAGE SENSING PROCESSING DEVICE, AND IMAGE PROCESSING METHOD

CROSS REFERENCE TO RELATED APPLICATION

This application claims priority under 35 U.S.C. §119 to Japanese Patent Application No. 2010-289067 filed on Dec. 27, 2010, the disclosure of which is incorporated herein by reference.

BACKGROUND OF THE INVENTION

1. Field of the Invention

The present invention relates to an imaging device, an image processing device and the like with respect to an adjustment method of a video signal.

2. Description of the Related Art

A great number of imaging devices such as surveillance cameras, DVD (Digital Versatile Disc) cameras or the like have conventionally had auto-focus functions therein for performing focus adjustment automatically. One of focusing methods in such auto-focus functions is a contrast method to perform focus adjustment by utilizing a fact that an in-focus state (just focus) is caused in a position where a contrast signal of an imaged picture shows the maximum amplitude.

In the imaging devices, the imaged picture comes into de-focus or focus by traveling a focus-lens in its optical axis direction, then the amplitude of the contrast signal also varies accordingly. In the case of the most fundamental contrast method, the focus-lens is traveled in its optical axis direction first of all, thereafter, a direction in which a target object comes into focus is detected based on an amplitude difference between the contrast signal before the focus-lens is traveled and the contrast signal after the focus-lens is traveled, accordingly, the focus-lens is traveled to the detected in-focus direction (e.g., see JP H11-136562 A).

SUMMARY OF THE INVENTION

In some cases of focusing methods in the aforementioned auto-focus function, the focus-lens is vibrated for detecting an in-focus position. This operation is denoted by a wobbling.

Figure 4:
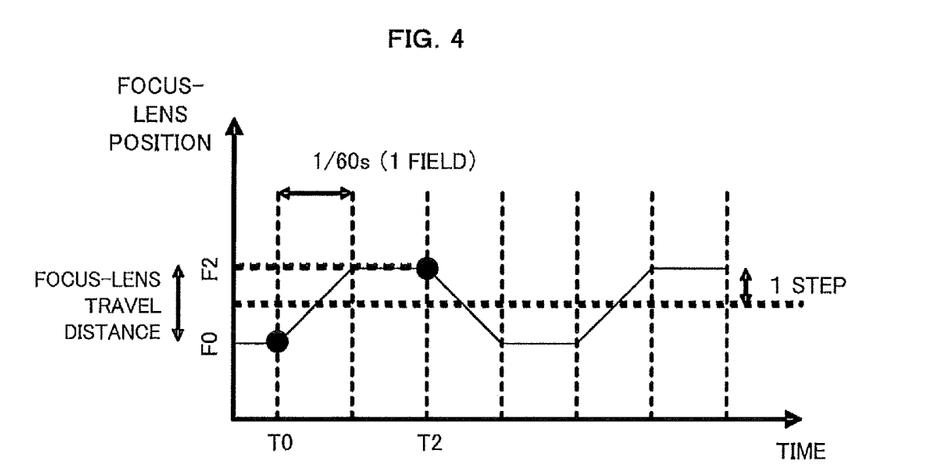
FIG. 4 is a diagram graphically explaining an operation of the wobbling.

FIG. 4 graphically shows a focus-lens position with a horizontal axis for time and a vertical axis for the focus-lens position. The vibration is made in a 4-field-long period, where one field is one sixtieth second long. While the wobbling is operated, the vibration of the focus-lens results in a trembling variation of an output picture from a camera.

Focus instability is suggested by the trembling output picture which is output from the camera while the wobbling is operated. Accordingly, a variation amount of the trembling output picture is preferably reduced as greatly as possible.

The present invention is made in consideration of the aforementioned problem, and an object of the present invention is to provide an imaging device, an image processing device, an image processing method and image processing software which are capable of improving a picture quality during the auto-focus control.

To solve the aforementioned problem, the imaging device of the present invention comprises an image pick-up element; a focus-lens which is arranged in front of the image pick-up element; a control section for controlling a position of the focus-lens to be traveled to an in-focus position; and an image processing section for having an output picture imaged by the image pick-up element and displayed by a display section be input therein and for adjusting the output picture, wherein the image processing section comprises a storage section for storing a de-focus threshold value which is a predetermined threshold value of a variation amount of an intensity value of the output picture, a first adder section for calculating an intensity value time difference variation amount which is the variation amount between the intensity value of the output picture being input and the intensity value of a predetermined-time previous output picture before the output picture is input, and a variation amount comparison section for comparing the intensity value time difference variation amount and the de-focus threshold value; when the variation amount comparison section determines that the intensity value time difference variation amount is less than the de-focus threshold value to be a comparison object, the image processing section calculates the intensity value of the output picture after being adjusted by subtracting the intensity value time difference variation amount from the intensity value of the output picture being input.

BRIEF DESCRIPTION OF THE DRAWINGS

FIGS. 5A-5B are diagrams graphically showing a sample of the variation of the intensity value in the output picture while the wobbling is operated.

DETAILED DESCRIPTION OF THE PREFERRED EMBODIMENT

Hereinafter, an embodiment of the present invention is described with reference to the accompanying drawings.

Figure 1:
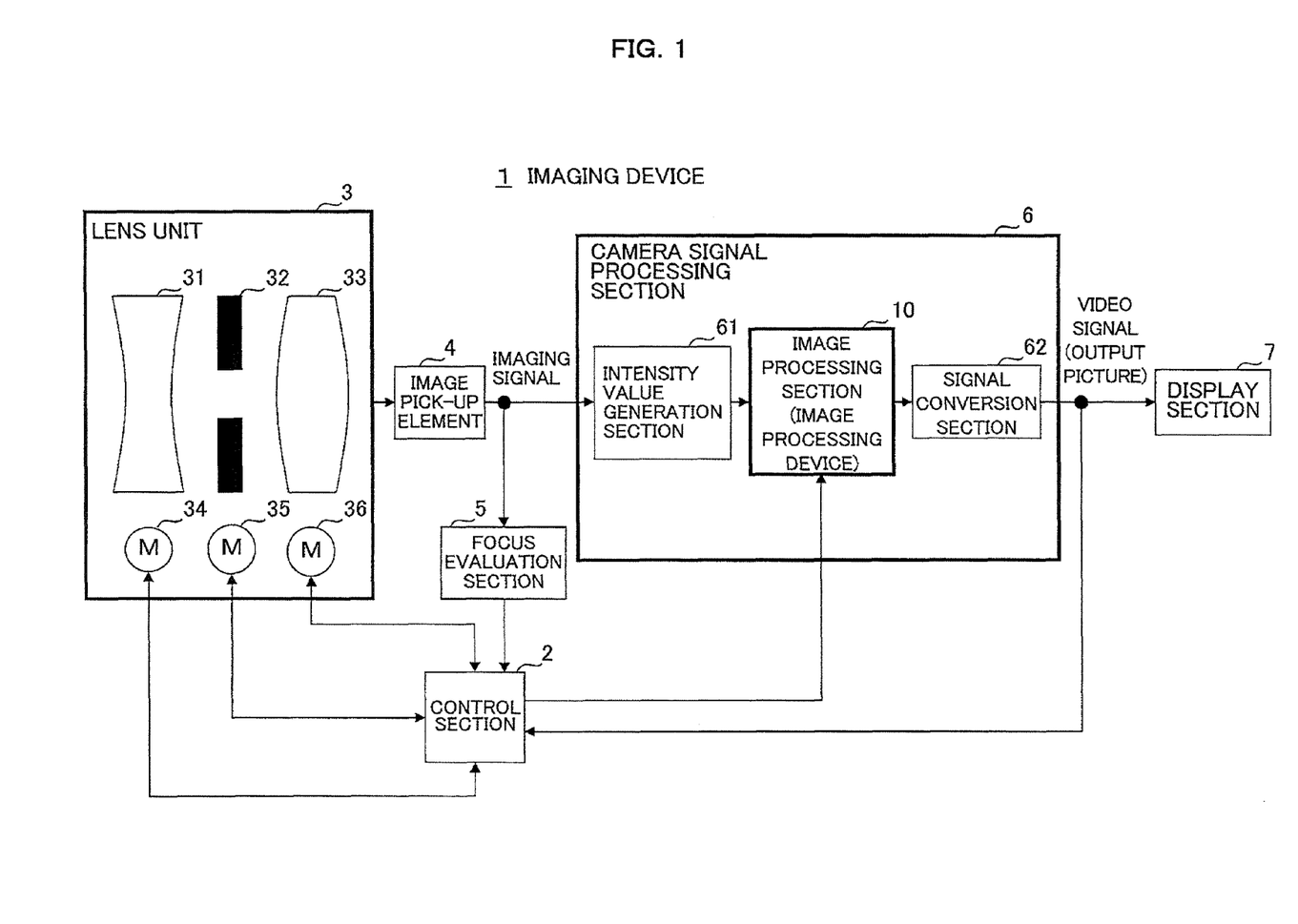
FIG. 1 is a block diagram showing a configuration of an imaging device with respect to an embodiment of the present invention.

As shown in FIG. 1, the imaging device 1 images a target object on an image pick-up element 4 via a lens unit 3, automatically determines a position of a focus-lens 33 at which the target object comes into focus by a focus evaluation section 5 and a control section 2, and performs auto-focus control which travels the focus-lens 33 to the position at which the target object comes into focus. During this control, the wobbling is operated, and a display section 7 sequentially displays the imaged picture even during the wobbling operation.

A camera signal processing section 6 includes an image processing section (image processing device) 10 therein, and here, adjustment is performed for reducing the variation amount of the trembling output picture during the wobbling operation.

<Configuration of Imaging Device 1>

The imaging device 1 comprises a control section 2, a lens unit 3, an image pick-up element 4, a focus evaluation section 5, a camera signal processing section 6, and a display section 7.

The control section 2 controls each of functions in the imaging device 1. When the auto-focus control is performed, the control section 2 drives a focus-lens 33 based on a focus evaluation value from the focus evaluation section 5 to be described later, via a focus-lens driving section 36. Moreover, the control section 2 drives a zoom-lens 31 via a zoom-lens driving section 34. In addition, the control section 2 controls a value of a diaphragm 32 via a diaphragm driving section 35 so as to adjust a brightness of the imaged picture based on a video signal which is input from a camera signal processing section 6.

Furthermore, the control section 2 outputs a focus-lens travel distance which is a travel distance of the focus-lens to an image processing section (image processing device) 10 to be described later.

The lens unit 3 comprises a zoom-lens 31 for scaling luminous flux from the target object, a diaphragm 32 for adjusting a reception light quantity, and the focus-lens 33 having a function to perform focus adjustment. Each of the zoom-lens 31 and the focus-lens 33 may have a plurality of lenses.

The image pick-up element 4 forms an optical image of the target object on a light receptor surface, and photoelectric-converts the formed image. The imaging signal after being photoelectric-converted is output to the camera signal processing section 6. The image pick-up element 4 is an image sensor, for example, such as CCD (Charge Coupled Device), CMOS (Complementary Metal Oxide Semiconductor) or the like.

The focus evaluation section 5 generates a contrast signal having a mountain-shaped characteristic which shows a peak at the in-focus position from the imaging signal, and generates a focus evaluation value from this contrast signal. Based on this focus evaluation value, a focus-lens position at which the target object comes into focus can be obtained. The camera signal processing section 6 comprises an intensity value generation section 61 for generating an intensity signal from the imaging signal, the image processing section (image processing device) 10 for processing a picture adjustment of the intensity signal, and a signal conversion section 62 for converting the intensity signal to a video signal. The intensity value generation section 61 and the signal conversion section 62 are of common conventional arts. The video signal here is a video signal in a standard signal format, for example, in conformity with NTSC (National Television System Committee) standard, PAL (Phase Alternating Line) standard or the like. The image processing section (image processing device) 10 will be described later.

The display section 7 displays the video signal (output picture) which is input from the camera signal processing section 6. Incidentally, this display section 7 may be connected via networks or the like.

Next, a picture adjustment process is described.

<Picture Adjustment Process>

First, a purpose of the picture adjustment process is explained.

Figure 2:
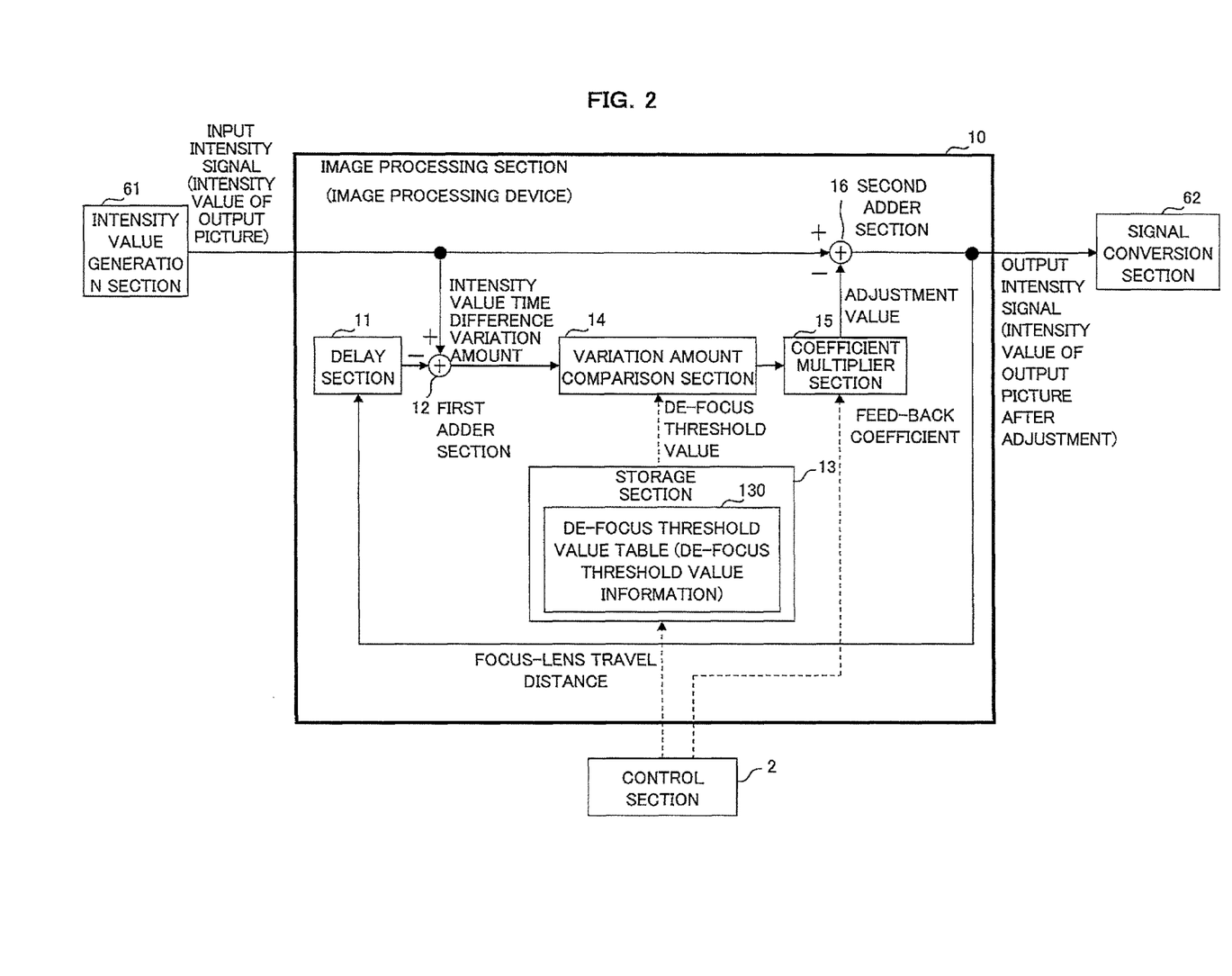
FIG. 2 is a block diagram showing a configuration of an image processing section (image processing device) in the imaging device with respect to the embodiment of the present invention.
Figure 5A:
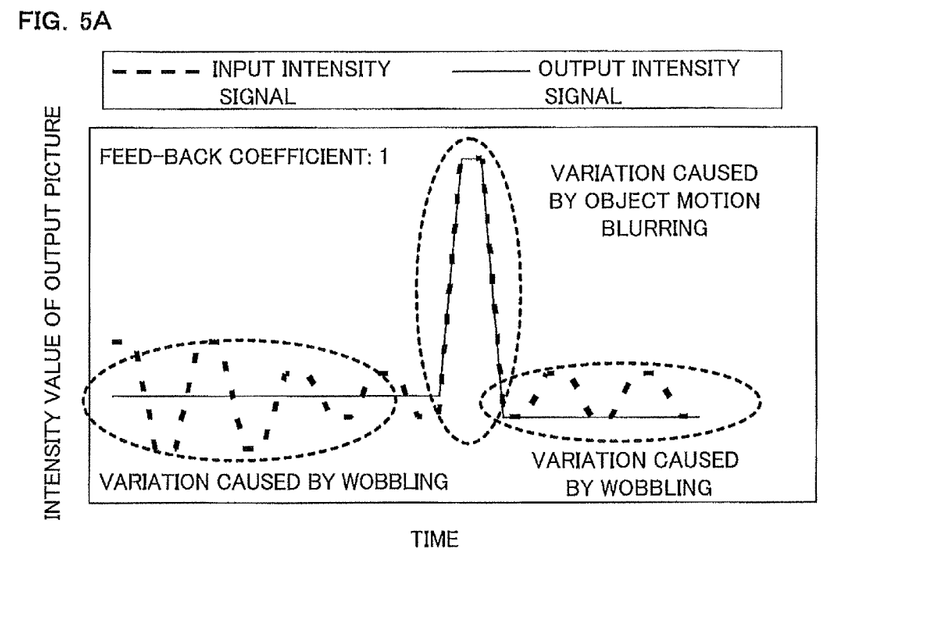
FIG. 5A shows an example in the case of a feed-back coefficient of 1.

FIG. 5A shows a relation between the intensity signal (input intensity signal) which is input from the intensity value generation section 61 and the intensity signal (output intensity signal) for which a picture adjustment is processed in FIG. 2. In FIG. 5A, a horizontal axis is for time and a vertical axis is for the intensity value of the output picture indicated by the intensity signal. Here, variations include a part of the variation caused by the wobbling and another part of the variation caused by an object motion blurring.

The variation caused by the wobbling is a trembling variation of the intensity value of the output picture which is caused by the focus-lens vibration during the wobbling operation. This variation results in the output picture being focused or de-focused, accordingly, the variation of the intensity signal is preferably suppressed as much as possible.

On the other hand, the variation caused by the object motion blurring is a substantial variation of the intensity value of the output picture regardless of whether the focus-lens is traveled or not, for example, when someone comes into a camera shooting range or when the camera is moved to focus on another target object. This variation is preferably output precisely without being suppressed. If the variation of the intensity signal is suppressed, problems such as an afterimage or a trailing are caused.

Therefore, the purpose of the picture adjustment process is an adjustment to suppress the variation caused by the wobbling and not to suppress the variation caused by the object motion blurring.

As shown in FIG. 5A, in the variation of the input intensity signal, the part of the variation caused by the wobbling is output after being suppressed and the other part of the variation caused by an object motion blurring is precisely output without being suppressed. Incidentally, a feed-back coefficient will be described later.

Next, a picture adjustment process is explained.

First, a variation amount of the intensity value corresponding to the focus-lens travel distance is stored in advance. Then, an intensity value time difference variation amount which is a variation amount between an input intensity signal (hereinafter, denoted by an "intensity value of output picture being input") and a predetermined-time previous intensity signal (hereinafter, denoted by an "intensity value of predetermined-time previous output picture") is obtained. When the intensity value time difference variation amount is less than the variation amount which has been stored in advance, it is determined that the variation is caused by the wobbling and the variation is adjusted. To the contrary, when the intensity value time difference variation amount is greater than the variation amount which has been stored in advance, it is determined that the variation is caused by the object motion blurring and the variation is not adjusted.

A de-focus threshold value table (de-focus threshold value information) 130 (see FIG. 3) specifies the variation amount of the intensity value corresponding to the focus-lens travel distance. This de-focus threshold value table (de-focus threshold value information) 130 is prepared in advance.

Figure 3:
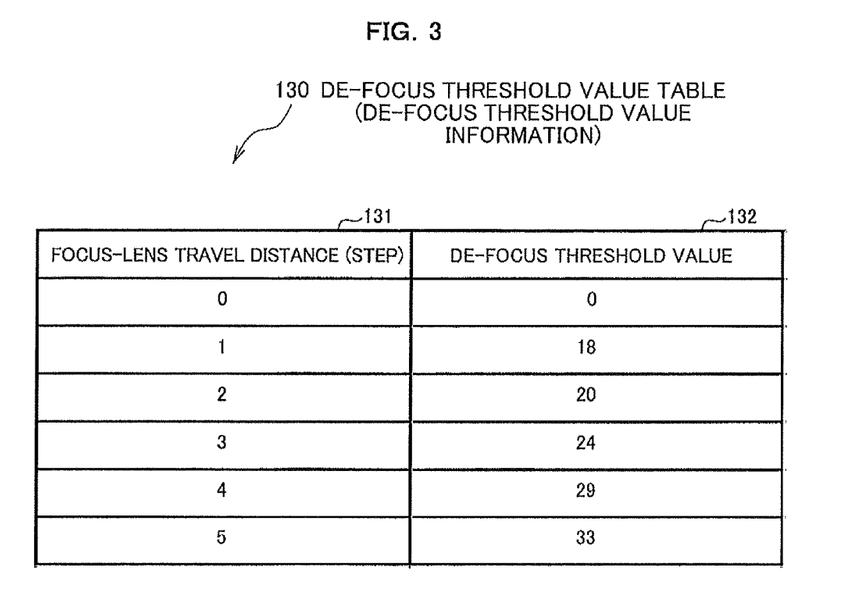
FIG. 3 shows an example of a de-focus threshold value table.

As shown in FIG. 3, the de-focus threshold value table (de-focus threshold value information) 130 comprises a focus-lens travel distance 131 and a de-focus threshold value 132 as information items.

The focus-lens travel distance 131 is a focus-lens travel distance, and in this case, a step is utilized as a unit. The step may be set as required.

The de-focus threshold value 132 is a threshold value of the variation amount of the intensity value corresponding to the focus-lens travel distance. For example, when the focus-lens is traveled by 1 step, the threshold value of the variation amount of the intensity value is 18. And when the focus-lens is traveled by 4 steps, the threshold value of the variation amount of the intensity value is 29.

<A Method to Prepare a De-Focus Threshold Value Table (De-Focus Threshold Value Information) 130>

Here, in conjunction with the method to prepare the de-focus threshold value table (de-focus threshold value information) 130, explained is a reason why to determine whether the variation is caused by the wobbling or by the object motion blurring based on the inequality relation between the intensity value time difference variation amount and the de-focus threshold value.

First, a white and black chart having a left half being all in white and a right half being all in black, is prepared. Then, with a focus on the white and black chart, the intensity value of a pixel located in a vicinity of a white-and-black boundary is measured. Next, the focus-lens is traveled by 1 step. As a result, a de-focused state is caused. That is to say, a pixel which was white becomes gray. Then, the intensity value of the pixel in the same location as the previous one is measured. Here, a difference of the measured intensity values is specified as a de-focus threshold value for a 1-step traveling of the focus-lens. In the same way, the differences of the intensity values are measured for a 2-step traveling, a 3-step traveling and so forth of the focus-lens to specify the table (see FIG. 3). Accordingly, the de-focus threshold value to be a comparison object can be changed, in accordance with the focus-lens travel distance.

In the meantime, the variation amount of the intensity value at the time when the focus-lens is traveled, varies depending on what is focused on before traveling the focus-lens (intensity of the target object).

In the case that this white and black chart is utilized as the target object, the variation amount of the intensity value at the time when the focus-lens is traveled, becomes the maximum. This is because the white having the maximum intensity value and the black having the minimum intensity value are intermingled.

Therefore, by specifying the de-focus threshold value (threshold value of the variation amount of the intensity value) corresponding to the focus-lens travel distance using the white and black chart, in the case that the intensity value time difference variation amount calculated in a first adder section 12 is less than this de-focus threshold value, it is assumed that the variation is caused by the focus-lens being traveled, that is to say, the variation is caused by the wobbling. On the other hand, in the case that the intensity value time difference variation amount is greater than this de-focus threshold value, it is assumed that the variation is caused by the object motion blurring, not by the focus-lens being traveled.

<Configuration of Image Processing Section (Image Processing Device) 10>

Next, a configuration of the image processing section (image processing device) 10 is explained, with reference to FIG. 2.

The image processing section (image processing device) 10 processes a picture adjustment of the intensity signal which is input from the intensity value generation section 61. The intensity signal, after the picture adjustment thereof is processed, is output to the signal conversion section 62.

In the picture adjustment process, a feed-back adjustment means for adjustment based on the variation amount of the output picture is utilized.

The image processing section (image processing device) 10 comprises a delay section 11, a first adder section 12, a storage section 13, a variation amount comparison section 14, a coefficient multiplier section 15, and a second adder section 16.

The delay section 11 delays the output of the intensity signal, and outputs the intensity value of the predetermined-time previous output picture. For example, in FIG. 4, the delay section 11 outputs, at the time T2, the intensity signal at the time T0. The delay time is set in advance depending on the wobbling period. The control section 2 issues a command to travel the focus-lens every time of a half of the wobbling period, accordingly in this case, the delay time is set to a 2-field value, which is a half of the wobbling period long. Thus, the delay section 11 outputs, at the time T2, the intensity signal at the time T0 which is the time before the focus-lens is traveled as much as the focus-lens travel distance (F2–F0) which is calculated by the control section 2.

The first adder section 12 calculates the intensity value time difference variation amount which is a variation amount between the intensity value of output picture being input and the intensity value of the predetermined-time previous output picture. The intensity value time difference variation amount is output to the variation amount comparison section 14.

The storage section 13 stores the de-focus threshold value table (de-focus threshold value information) 130 which is prepared in advance.

The variation amount comparison section 14 makes an inequality comparison between the intensity value time difference variation amount and the de-focus threshold value corresponding to the focus-lens travel distance which is input from the control section 2, with reference to the de-focus threshold value table (de-focus threshold value information) 130. The comparison result and the intensity value time difference variation amount are output to the coefficient multiplier section 15.

The coefficient multiplier section 15 calculates an adjustment value by multiplying the intensity value time difference variation amount by the feed-back coefficient. When the intensity value time difference variation amount is determined to be less than the de-focus threshold value to be a comparison object (the case of the variation caused by the wobbling), the coefficient multiplier section 15 sets the feed-back coefficient to 1 so as to enable the adjustment. To the contrary, when the intensity value time difference variation amount is determined to be greater than the de-focus threshold value to be a comparison object (the case of the variation caused by the object motion blurring), the coefficient multiplier section 15 sets the feed-back coefficient to 0 so as to disable the adjustment. The calculated adjustment value is output to the second adder section 16. Incidentally, when the intensity value time difference variation amount is determined to be identical as the de-focus threshold value to be a comparison object, the coefficient multiplier section 15 may set the feed-back coefficient to 1, alternatively 0.

The second adder section 16 calculates the intensity value of the output picture after the adjustment by subtracting the adjustment value from the intensity value of output picture being input.

Incidentally, the image processing section (image processing device) 10 can be realized with a commonly used computer including a built-in CPU and a memory (not shown). Here, the image processing section (image processing device) 10 is operated by the image processing software so that the computer functions as each of the aforementioned function means. In addition, the image processing section (image processing device) 10 may be realized with hardware circuits such as ICs (Integrated Circuit), LSIs or the like.

<Operation of Imaging Device 1 and Image Processing Section (Image Processing Device) 10>

Figure 6:
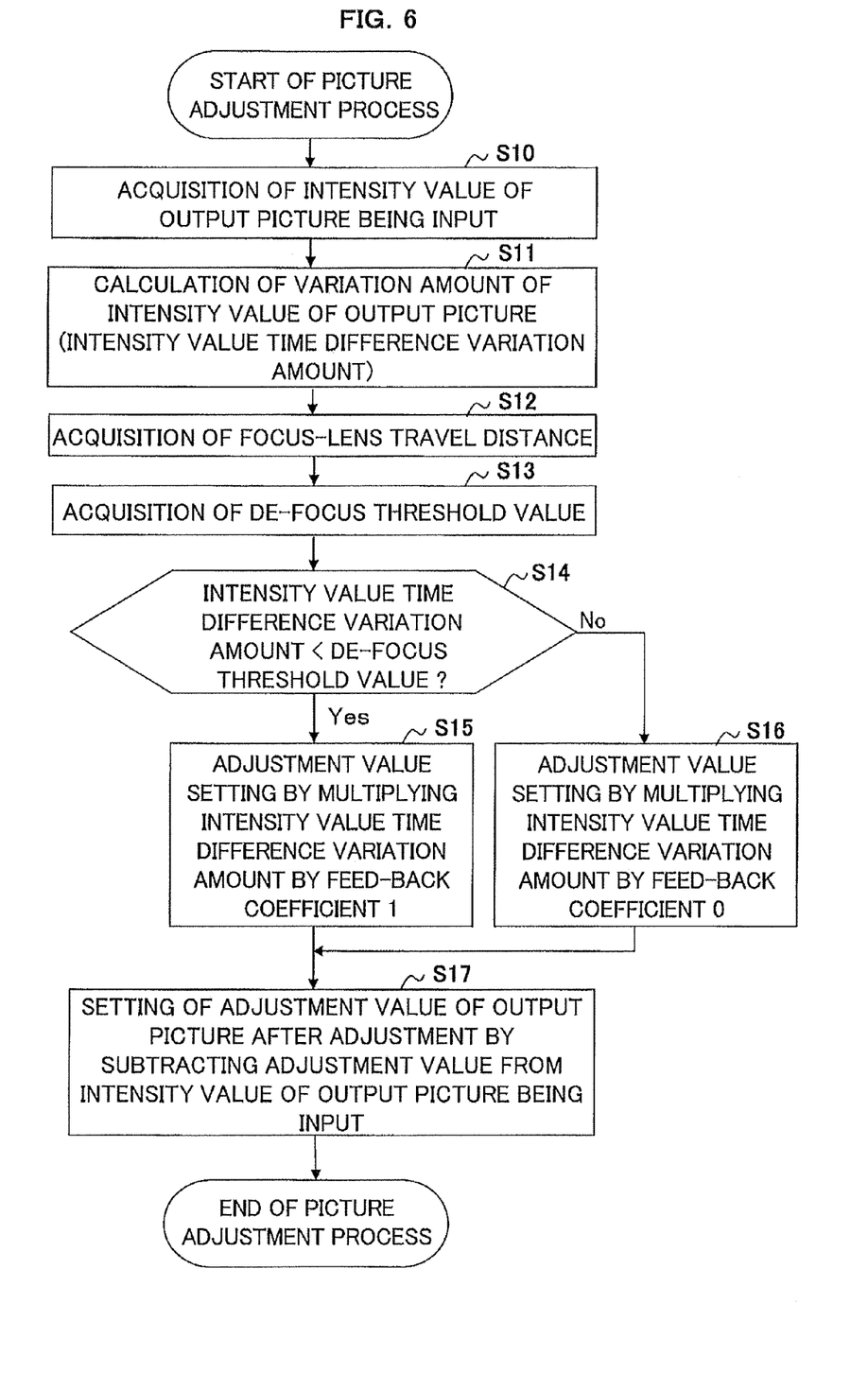
FIG. 6 is a flow chart showing an operation of the image processing section (image processing device) with respect to the embodiment of the present invention.

Next, an operation of the imaging device 1 is explained, with reference to FIG. 1, FIG. 2, and FIG. 6.

First, FIG. 1 is referred to. The control section 2 of the imaging device 1 starts the wobbling operation by traveling the focus-lens 33 in its optical axis direction via the focus-lens driving section 36.

Next, the imaging device 1 receives a light on the image pick-up element 4 via the lens unit 3, and outputs the imaging signal to the focus evaluation section 5 and the camera signal processing section 6.

Subsequently, the control section 2 determines the focus-lens travel distance based on the focus evaluation value from the focus evaluation section 5, outputs this focus-lens travel distance to the image processing section (image processing device) 10, while traveling the focus-lens 33 via the focus-lens driving section 36.

The intensity value generation section 61 generates the intensity signal from the imaging signal which is input from the image pick-up element 4. This intensity signal is output to the image processing section (image processing device) 10.

As shown in FIG. 2, the image processing section (image processing device) 10 acquires the input intensity signal which is input from the intensity value generation section 61 (hereinafter, denoted by an "intensity value of output picture being input").

<Operation of Picture Adjustment Process>

Next, an operation of the image processing section (image processing device) 10 is explained, with reference to a flow chart of FIG. 6 (see FIG. 2 for a configuration, as required).

In the step S10, the image processing section (image processing device) 10 acquires the intensity value of output picture being input.

In the step S11, the first adder section 12 calculates a variation amount (intensity value time difference variation amount) between the intensity value of output picture being input and the intensity value of the output picture which is delayed by the delay section 11 as long as the predetermined time.

In the step S12, the variation amount comparison section 14 acquires, from the control section 2, the focus-lens travel distance during the predetermined time for which the delay section 11 delays the output picture.

In the step S13, the variation amount comparison section 14 refers to the de-focus threshold value table 130, and acquires the de-focus threshold value corresponding to the acquired focus-lens travel distance during the predetermined time for which the delay section 11 delays the output picture.

In the step S14, the variation amount comparison section 14 compares the intensity value time difference variation amount and the acquired focus-lens travel distance, determines the inequality relation, and also outputs the intensity value time difference variation amount to the coefficient multiplier section 15.

In the case that the intensity value time difference variation amount is less than the de-focus threshold value (step S14: Yes), that is to say, when the variation is determined to be caused by the wobbling, in the step S15, the coefficient multiplier section 15 calculates an adjustment value by multiplying the intensity value time difference variation amount by the feed-back coefficient 1, and also outputs this adjustment value to the second adder section 16.

On the other hand, in the case that the intensity value time difference variation amount is greater than the de-focus threshold value (step S14: No), that is to say, when the variation is determined to be caused by the object motion blurring, in the step S16, the coefficient multiplier section 15 calculates the adjustment value by multiplying the intensity value time difference variation amount by the feed-back coefficient 0, and also outputs this adjustment value to the second adder section 16.

In the step S17, the second adder section 16 calculates the intensity value of the output picture after the adjustment by subtracting the adjustment value from the intensity value of output picture being input.

Thereafter, the signal conversion section 62 converts the intensity value of output picture after being adjusted to a video signal (output picture), and the display section 7 displays the video signal (output picture).

In the operations described above, the de-focus threshold value which is a variation amount of the intensity value to be a comparison object is varied corresponding to the focus-lens travel distance. Accordingly, a variation suppression effect can be given to the variation caused by the wobbling, and in the case of the variation caused by the object motion blurring, the variation suppression effect which causes a trailing, or an afterimage can be excluded.

That is to say, the trembling variation of the picture caused by the wobbling during the auto-focus control, can be suppressed, furthermore the actual object motion blurring can be precisely output without being suppressed. Accordingly, the picture quality during the auto-focus control can be improved.

Modified Embodiment

As above, one embodiment of the present invention has been described. However, it should be further understood by those skilled in the art that the present invention is not to be limited to the embodiment set forth hereinabove and may take on modifications and alterations without departing from the spirit of the present invention, for example, as follows.

The feed-back coefficient can be changed to various values.

Figure 5B:
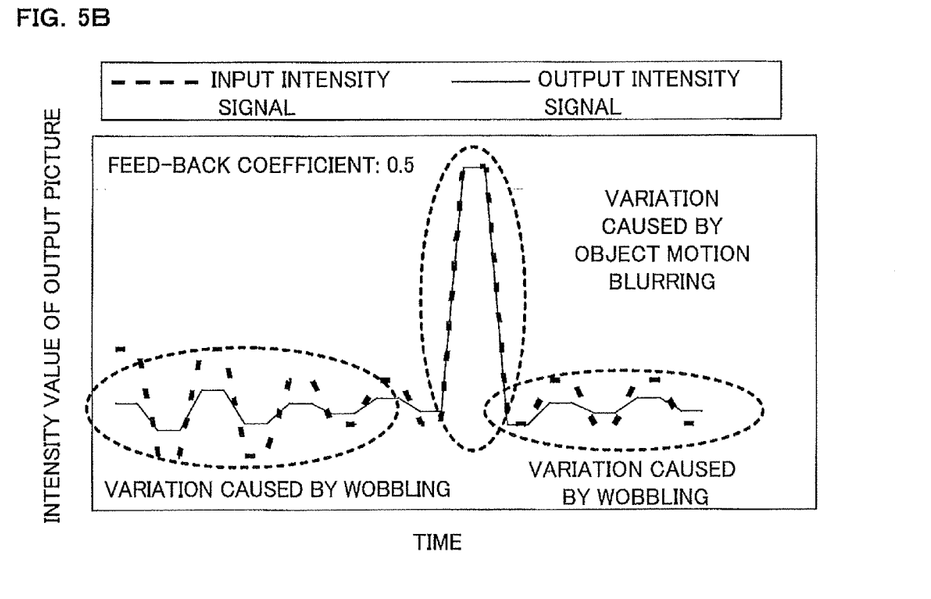
FIG. 5B shows another example in the case of a feed-back coefficient of 0.5.

For example, FIG. 5B shows a relation between the input intensity signal and the output intensity signal when the feed-back coefficient is set to 0.5, in the case that the intensity value time difference variation amount is determined to be less than the de-focus threshold value to be a comparison object (in the case of the variation caused by the wobbling). As well as the case of the feed-back coefficient of 1 (see FIG. 5A), the input intensity signal variation is suppressed in the part of the variation caused by the wobbling, accordingly the wobbling gives less impact to the output intensity signal. In addition, in the part of the variation caused by the object motion blurring, both diagrams show the identical values for the input intensity signal and the output intensity signal, accordingly the variation of the input intensity signal is precisely output without being suppressed.

When the different feed-back coefficients are compared, the case of the feed-back coefficient of 1 is more effective than that of the feed-back coefficient of 0.5, to suppress the variation caused by the wobbling. However, in the case of the feed-back coefficient of 0.5, when the object motion blurring is caused by a slow-moving variation, this object motion blurring is not completely suppressed, even the variation is determined to be a variation caused by the wobbling. Then, in a short while, the variation caused by this object motion blurring can be output. The feed-back coefficient is preferably to be set to 1 at maximum and to 0.4 at minimum to assure the adjustment operation.

Moreover, in the case that the intensity value time difference variation amount is determined to be greater than the de-focus threshold value to be a comparison object (in the case of the variation caused by the object motion blurring), the feed-back coefficient may be a value which is close to zero, for example, 0.1. Here, the value which is close to zero is preferably to be set to 0.2 at maximum. The effect to precisely output the object motion blurring is slightly decreased, however, in the case that the wobbling and the object motion blurring are caused at the same time or the like, the effect to suppress the input intensity signal variation functions to a certain extent, even if the input intensity signal variation is not determined to be caused by the wobbling.

As described above, the feed-back coefficient in the case of the variation caused by the object motion blurring should be set at a value less than the feed-back coefficient in the case of the variation caused by the wobbling, and both of the feed-back coefficients should be set at values within a range between 0 and 1.

The de-focus threshold value is acquired by the measurement above, however, the de-focus threshold value, when possible to be approximated with a numerical formula, may be acquired by using the numerical formula instead of the de-focus threshold value table. In order to further heighten the precision, a de-focus threshold value table with a zoom magnification of 1, another de-focus threshold value table with a zoom magnification of 2 or the like may be prepared. Furthermore, since it is possible that the de-focus threshold value varies depending on a F number, the de-focus threshold value in accordance with the F number may be measured as well so as to prepare the de-focus threshold value table. Thus, corresponding not only to the focus-lens travel distance but also to at least one of the zoom magnification or the F number, the de-focus threshold value may be varied in accordance with at least one of the zoom magnification or the F number in addition to the focus-lens travel distance.

The present invention is preferably applied to imaging devices such as video cameras including a built-in auto-focus function, electronic still cameras, camera mechanism blocks of mobile phones, or the like.

What is claimed is:

1. An image sensing device comprising:
   an image pick-up element;
   a focus-lens which is arranged in front of the image pick-up element;
   a control section for controlling a position of the focus-lens to be traveled to an in-focus position; and
   an image processing section for having an output picture imaged by the image pick-up element and displayed by a display section be input therein and for adjusting the output picture, wherein:
      the image processing section comprises a storage section for storing a de-focus threshold value which is a predetermined threshold value of a variation amount of an intensity value corresponding to a focus-lens travel distance, a first adder section for calculating an intensity value time difference variation amount which is the variation amount between the intensity value of the output picture being input and the intensity value of a predetermined-time previous output picture before the output picture is input, and a variation amount comparison section for comparing the intensity value time difference variation amount and the de-focus threshold value,
      when the variation amount comparison section determines that the intensity value time difference variation amount is less than the de-focus threshold value to be a comparison object, the image processing section calculates the intensity value of the output picture after being adjusted by subtracting the intensity value time difference variation amount from the intensity value of the output picture being input,
      the storage section stores a de-focus threshold value information which provides a correspondence between a focus-lens travel distance which is a travel distance of the focus-lens and the de-focus threshold value which is a predetermined value indicating the variation amount of the intensity value of the output picture, and
      the variation amount comparison section varies the de-focus threshold value to be a comparison object, corresponding to the predetermined-time previous focus-lens travel distance.

2. The image sensing device according to claim 1 further comprising:
   a coefficient multiplier section for calculating an adjustment value by multiplying the intensity value time difference variation amount by a feed-back coefficient which is a coefficient for making adjustment; and
   a second adder section for calculating the intensity value of the output picture after being adjusted by subtracting the adjustment value from the intensity value of the output picture being input, wherein
   when the variation amount comparison section determines that the intensity value time difference variation amount is less than the de-focus threshold value to be a comparison object, the coefficient multiplier section sets the feed-back coefficient so as to make adjustment; and
   when the variation amount comparison section determines that the intensity value time difference variation amount is greater than the de-focus threshold value to be a comparison object, the coefficient multiplier section sets the feed-back coefficient to zero or to a value close to zero.

3. The image sensing device according to claim 2, wherein the coefficient multiplier section sets the feed-back coefficient being set at the time when the variation amount comparison section determines that the intensity value time difference variation amount is greater than the de-focus threshold value to be a comparison object, to a value less than the feed-back coefficient being set at the time when the variation amount comparison section determines that the intensity value time difference variation amount is less than the de-focus threshold value to be a comparison object, and sets both of the feed-back coefficients within a range between 0 and 1.

4. The image sensing device according to claim 1, wherein the de-focus threshold value is a value corresponding to at least one of a zoom magnification or a F number; and
   the variation amount comparison section varies the de-focus threshold value to be a comparison object further corresponding to at least one of the zoom magnification or the F number.

5. The image sensing device according to claim 1, wherein the de-focus threshold value information is prepared by a measurement or by a theoretical calculation in advance utilizing a white and black chart.

6. The image sensing device according to claim 1, wherein the image processing section adjusts the output picture displayed by the display section, exclusively while the wobbling of the focus-lens is operated.

7. An image processing method of an image processing device for adjusting an output picture which is a picture imaged by an image pick-up element, wherein:
   a control section of the image processing device carries out a threshold value acquiring step for acquiring a de-focus threshold value which is a predetermined threshold value of a variation amount of an intensity value corresponding to a focus-lens travel distance from a storage section;
   a first adder section of the image processing device carries out a first adding step for calculating an intensity value time difference variation amount which is a variation amount between the intensity value of the output picture being input and an intensity value of a predetermined-time previous output picture before the output picture is input;

a variation amount comparison section of the image processing device carries out a variation amount comparison step for comparing the intensity value time difference variation amount and the de-focus threshold value;

when the variation amount comparison section determines that the intensity value time difference variation amount is less than the de-focus threshold value to be a comparison object, the image processing device carries out a step for calculating the intensity value of the output picture after being adjusted by subtracting the intensity value time difference variation amount from the intensity value of the output picture being input, the storage section stores a de-focus threshold value information which provides a correspondence between a focus-lens travel distance which is a travel distance of the focus-lens and the de-focus threshold value which is a predetermined value indicating the variation amount of the intensity value of the output picture; and the variation amount comparison section varies the de-focus threshold value to be a comparison object, corresponding to the predetermined-time previous focus-lens travel distance.

\* \* \* \* \*